United States Patent
Yao et al.

(10) Patent No.: US 7,688,552 B2
(45) Date of Patent: Mar. 30, 2010

(54) HEAD GIMBAL ASSEMBLY HAVING DIMPLE-SHAFT LIMITER AND MANUFACTURING METHOD THEREOF AND DISK DRIVE UNIT WITH THE SAME

(75) Inventors: MingGao Yao, DongGuan (CN); Masashi Shiraishi, Hong Kong (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 845 days.

(21) Appl. No.: 11/500,912

(22) Filed: Aug. 9, 2006

(65) Prior Publication Data

US 2008/0037174 A1    Feb. 14, 2008

(51) Int. Cl.
*G11B 5/48*    (2006.01)
(52) U.S. Cl. .............. 360/245.1; 360/245.7; 26/603.03
(58) Field of Classification Search .............. 360/245.1, 360/245.7; 26/603.03
See application file for complete search history.

(56) References Cited

U.S. PATENT DOCUMENTS

| 5,473,488 A | * | 12/1995 | Gustafson et al. | ........ 360/245.5 |
| 6,115,221 A | * | 9/2000 | Utsunomiya | ............. 360/245.1 |
| 6,965,500 B1 | * | 11/2005 | Hanna et al. | ................. 360/245 |

* cited by examiner

*Primary Examiner*—A. J. Heinz
(74) *Attorney, Agent, or Firm*—Nixon & Vanderhye P.C.

(57) ABSTRACT

A HGA includes a slider and a suspension for supporting the slider. The suspension includes a load beam, a base plate, and a flexure, which are assembled together. The flexure has a suspension tongue with a suspension through hole defined therein at a position corresponding to a center of the slider mounted on the suspension tongue. A dimple is provided to connect the suspension tongue and the load beam. The dimple has a first bump, a second bump and a shaft connecting the first and the second bumps. The shaft of the dimple extends through the suspension through hole to limit the suspension tongue between the first and the second bumps. Meanwhile, a manufacturing method of the HGA and a disk drive unit with the HGA are disclosed.

23 Claims, 10 Drawing Sheets

HEAD GIMBAL ASSEMBLY HAVING DIMPLE-SHAFT LIMITER AND MANUFACTURING METHOD THEREOF AND DISK DRIVE UNIT WITH THE SAME

FIELD OF THE INVENTION

The present invention relates to a disk drive unit, and more particularly to a head gimbal assembly (HGA) and its manufacturing method.

BACKGROUND OF THE INVENTION

In the disk drive unit industry today, different methods are used to support a slider with magnetic head to selectively read from and write to a rotating disk, one of which is called CSS (contact start stop), and the other is called load/unload, both kinds of the methods are related with a support structure or design of a suspension of a HGA in the disk drive unit.

Figure 1A:
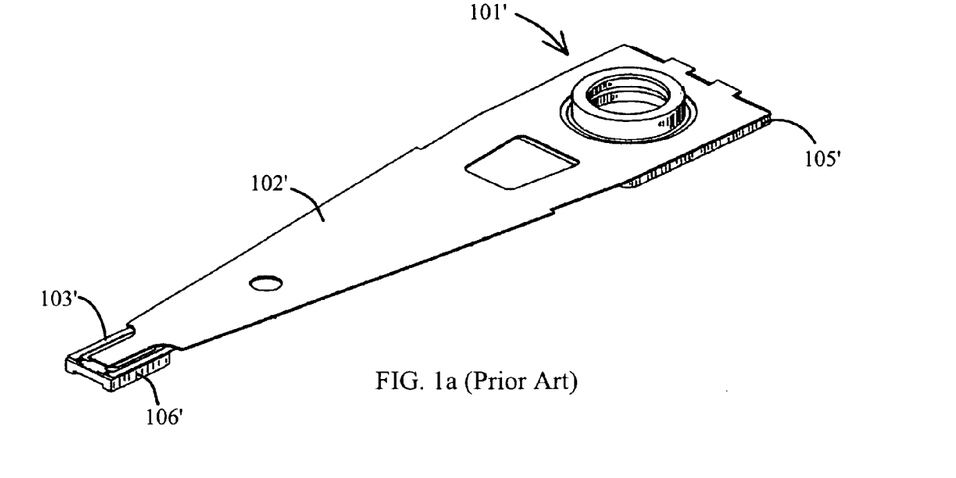
FIG. 1a is a perspective view of a HGA.
Figure 1B:
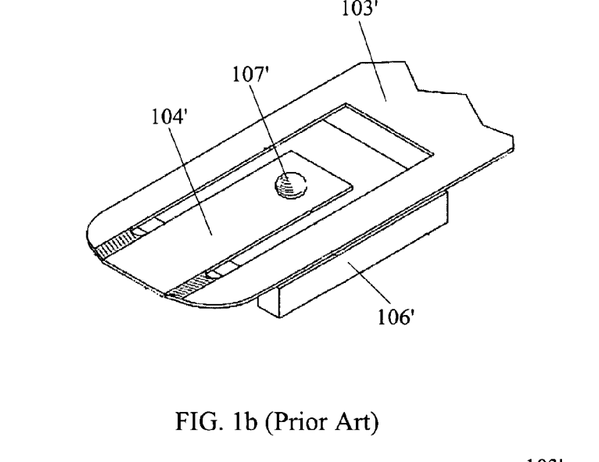
FIG. 1b is a partially enlarged view of the conventional HGA, showing a suspension tongue of the HGA in detail.
Figure 1C:
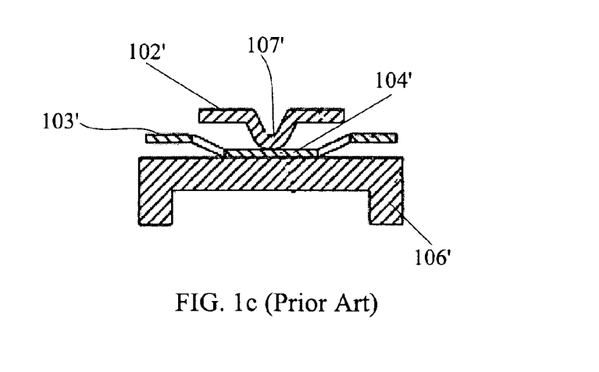
FIG. 1c is a partial, cross-sectional view of the conventional HGA.

FIGS. 1a-1c illustrate a conventional HGA that includes a slider 106', incorporating a magnetic read/write head, and a suspension 101'. The suspension 101' includes a load beam 102', a flexure 103', and a base plate 105', all of which are assembled together. The flexure 103' provides a suspension tongue 104' for supporting the slider 106' thereon. A dimple 107' is formed on a distal end of the load beam 102' to support the suspension tongue 104 of the flexure 103' at a position corresponding to a center of the slider 106', thereby transferring load forces from the load beam 102' to the slider 106'. The top of the dimple 107' is cone-shaped, so the flexure 103' can rotate freely around top end of the dimple 107', and the slider 106' mounted on the suspension tongue 104' of the flexure 103', thus the slider 106' can rotate along with the suspension tongue 104'.

However, such a dimple is required to use a punch coining die or a pulsed laser energy treatment to manufacture, so the manufacturing processes are rather complicated and easy to cause the dimple geometry asymmetric. Once the dimple is geometry asymmetric, the load beam 102' and the flexure 103' may be misaligned with each other, and the dimple 107' may not match the center of the slider 106' so as not to transfer the loading force to the center of the slider 106', which will cause unbalance of the movement of the slider 106' and, in turn, affect the slider 106' flying stability. Moreover, even if the geometry of the dimple 107' is symmetric, as there is no special positioning mechanism, it is difficult to align the load beam 102' with the flexure 103' in assembly.

Figure 2A:
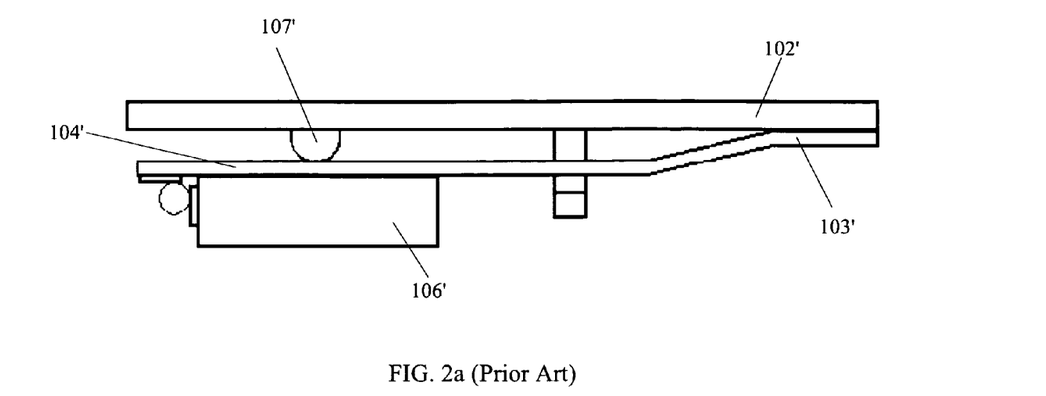
FIG. 2a is a partially enlarged side perspective view of the conventional HGA, which showing states of a dimple supporting the suspension tongue, the suspension tongue pressing on the dimple freely, and a slider being fully mounted on the suspension tongue in detail.
Figure 2B:
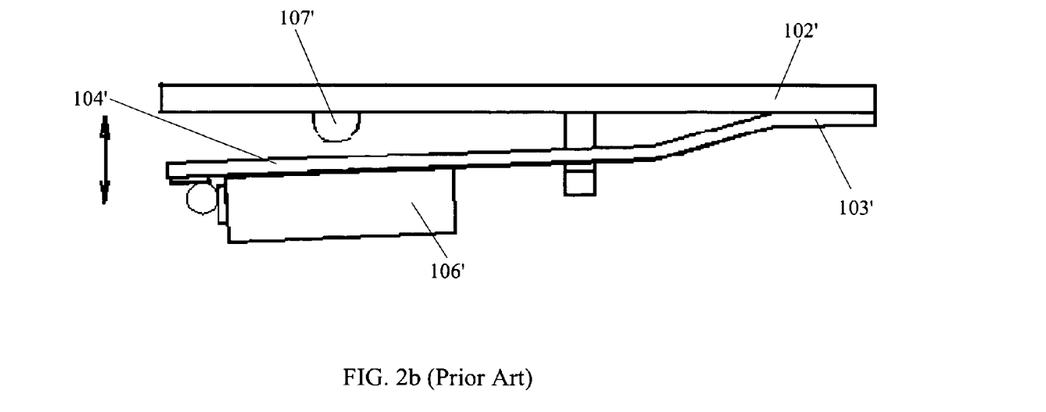
FIG. 2b is a partially enlarged perspective side view of the conventional HGA, illustrating the dimple and the suspension tongue being separate during a shock event.

In additional, the conventional HGA has a drawback in shock performance. As illustrated in FIGS. 2a and 2b, since the slider 106' and the flexure 103' are supported by the dimple 107' only and the other region is free, the suspension tongue 104' of the flexure 103' and the dimple 107' are easy to separate when a shock or a vibration event happens. Even a limiter is provided to the suspension 101' to reduce the movement of the flexure 103', but the movement can not be avoided because the clearance of the limiter gap is difficult to control.

Furthermore, a dimple contact force (DCF) between the dimple 107' and the flexure 103' is a very important parameter to keep a good characteristic of the HGA. Due to the DCF is very small (Normal DCF is 2-4 g for 30% slider and 0.1-0.3 g for 20% slider), it is difficult to test and control the DCF especially for the small size slider (such as 20%, 15%, or 10% slider).

Figure 5A:
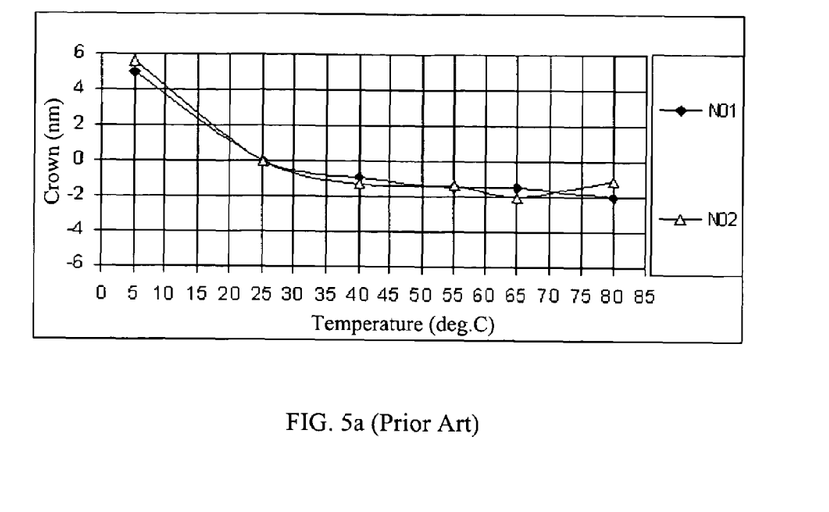
FIG. 5a is a graphical chart of the slider crown of the conventional HGA against temperature.

Meanwhile, during the operation of the disk drive unit and the high-speed rotation of the slider 106', the temperature of the slider 106' increases quickly, and the slider 106' endures a profile deformation against the temperature change. The profile deformation, especially the air bearing surface (ABS) profile deformation, affects the slider 106' flying height and stability. FIG. 5a is a graph to show a curve between crown of a slider 106' against temperature. It can be seen from FIG. 5a that the crown change is quite big. This is because the slider 106' in the conventional HGA is fully mounted on the suspension tongue 104' and the heat generated between the slider 106' and the suspension tongue 104' is not easy to be emitted. This will seriously affect the flying height characteristic and the flying stability of the slider 106'.

Therefore, there is a need for an improved head suspension assembly and a disk drive unit to overcome these above-mentioned disadvantages.

SUMMARY OF THE INVENTION

Accordingly, a main object of the present invention is to provide a HGA that has a good shock performance and a good flying performance.

Another object of the present invention is to provide a disk drive unit that has a good shock performance and a good flying performance.

Yet another object of the present invention is to provide a method for manufacturing a HGA to improve shock performance and flying performance of the HGA.

To achieve the above objects, the present invention provides a HGA which includes a slider and a suspension for supporting the slider. The suspension includes a load beam, a base plate, and a flexure, all of which are assembled together. The flexure has a suspension tongue on which the slider is mounted. A suspension through hole is defined in the suspension tongue at a position corresponding to a center area of the slider. The HGA further includes a dimple connecting the suspension tongue with the load beam. The dimple has a first bump, a second bump and a shaft connecting the first and the second bumps. The shaft of the dimple extends through the suspension through hole to limit the suspension tongue between the first and the second bumps.

In the present invention, diameters of the first and the second bumps are bigger than that of the shaft. The slider is partially mounted on the suspension tongue, for example, by sandwiching an adhesive material between the slider and the suspension tongue to adhere the slider to the suspension tongue. Also, the height of the adhesive material is bigger than that of the second bump.

In an embodiment of the present invention, a bow bump is formed on the load beam to support the suspension tongue, and a load beam through hole is formed in the bow bump corresponding to the suspension through hole. The shaft of the dimple extends through the load beam through hole to limit the load beam between the first and the second bumps. In another embodiment, the suspension tongue provides a mounting pattern for applying an adhesive material therein, and a plurality of protruded ribs are formed around the mounting pattern. The mounting pattern is formed at a position corresponding to a leading edge or a trailing edge of the slider.

According to the present invention, a disk drive unit including a HGA, a drive arm connecting with the HGA, a disk, and a spindle motor to spin the disk. The HGA includes a slider and a suspension for supporting the slider. The suspension comprises a load beam, a base plate, and a flexure, which are assembled together. The flexure has a suspension tongue on which the slider is mounted. A suspension through hole is formed in the suspension tongue at a position corresponding to a center area of the slider. The HGA further includes a dimple connecting the suspension tongue and the load beam. The dimple has a first bump, a second bump and a shaft connecting the first and the second bumps. The shaft of the dimple extends through the suspension through hole to limit the suspension tongue between the first and the second bumps.

According to the present invention, a manufacturing method of a HGA comprises the steps of: providing a slider, a load beam, and a flexure having a suspension tongue; forming a suspension through hole in the suspension tongue at a position corresponding to a center area of the slider mounted on the suspension tongue; providing a blank dimple which has a first bump and a shaft extending from the first bump; fixing the first bump to the load beam at a position corresponding to the suspension through hole; extending the shaft of the blank dimple through the suspension through hole of the suspension tongue; forming a second bump at a free end of the shaft so as to connect the load beam with the suspension tongue; and mounting the slider on the suspension tongue at a predetermined position thereon.

According to another embodiment of the present invention, a manufacturing method of a HGA comprises the steps of: providing a slider, a load beam, and a flexure having a suspension tongue; forming a suspension through hole in the suspension tongue at a position corresponding to a center area of the slider mounted on the suspension tongue, and forming a load beam through hole in the load beam at a position corresponding to the suspension through hole; aligning the suspension through hole with the load beam through hole; providing a blank dimple, the blank dimple having a first bump and a shaft extending from the first bump; extending the shaft of the blank dimple through the suspension through hole of the suspension tongue and the load beam through hole of the load beam; forming a second bump at a free end of the shaft so as to connect the load beam and the suspension tongue; and mounting the slider on the suspension tongue at a predetermined position thereon.

Comparing with the prior art, on one hand, the suspension tongue is limited between the first bump and the second bump so that the relative position between the load beam and the suspension tongue can be accurately regulated. Namely, the load beam and the suspension tongue can be kept a high position accuracy and good assembly symmetry so as to make the dimple accurately align with the center of the back surface of the slider without deviation, which keeps the load force from the load beam always evenly transferring to the center of the slider through the dimple when the slider is flying, thus making the slider always keep a good flying attitude and do not cause vibration, and finally ensure the slider have a good fly stability and improve the slider flying characteristic.

On the other hand, the HGA of the present invention has a good shock performance. The dimple and the suspension tongue never separate with each other, and during operation of the disk drive unit, the load force directly apply to the slider through the first dump of the dimple, which ensures an enough dimple contact force between the first bump and the suspension tongue.

In addition, in the present invention, since the slider is partially mounted on the suspension tongue, the heat generated between the slider and the suspension tongue is easy to be emitted so that the crown change of the slider against the temperature is very small, which will keep ABS crown stable so as to keep the slider fly stability during high-speed rotation of the slider.

The dimple of the present invention is very easy to manufacture and has a good assembly symmetry so as to improve the slider flying height characteristic, shock performance of the HGA and enhances the slider fly stability.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate understanding of the various embodiments of this invention. In such drawings.

DETAILED DESCRIPTION OF ILLUSTRATED EMBODIMENTS

Various preferred embodiments of the instant invention will now be described with reference to the figures, wherein like reference numerals designate similar parts throughout the various views.

Figure 3A:
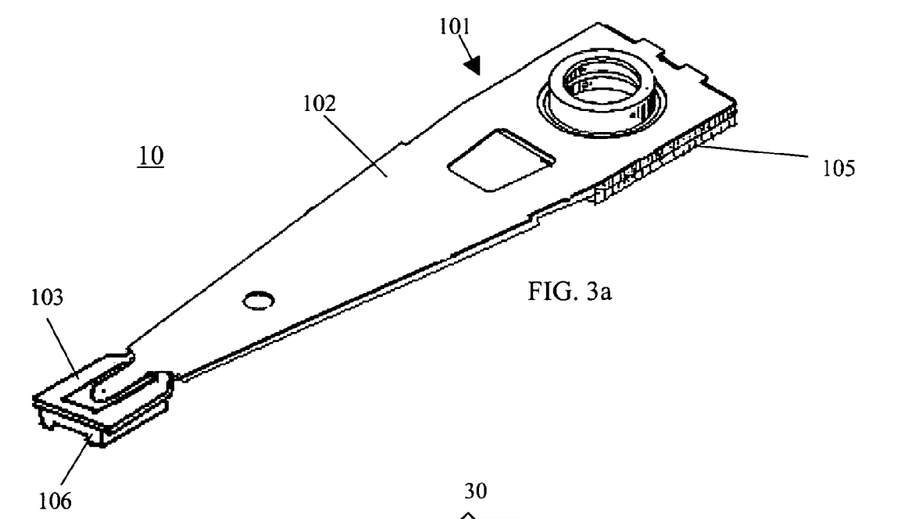
FIG. 3a is a perspective view of a first embodiment of a HGA in accordance with the present invention.
Figure 3B:
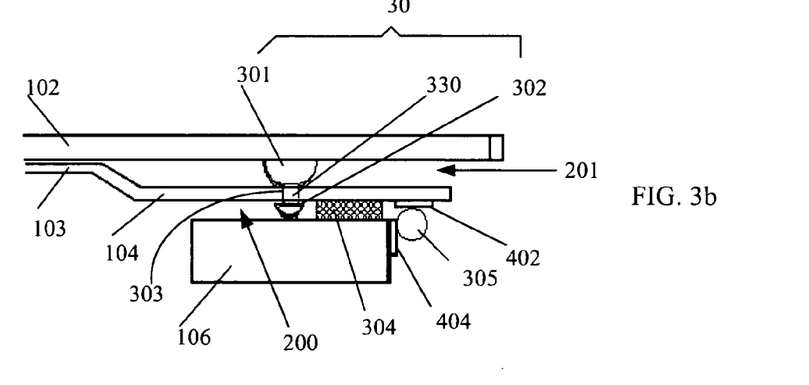
FIG. 3b is a partially, enlarged side perspective view of the HGA shown in FIG. 3a, showing a dimple in detail, and illustrating a slider being partially mounted on a suspension tongue of a suspension of the HGA.
Figure 3C:
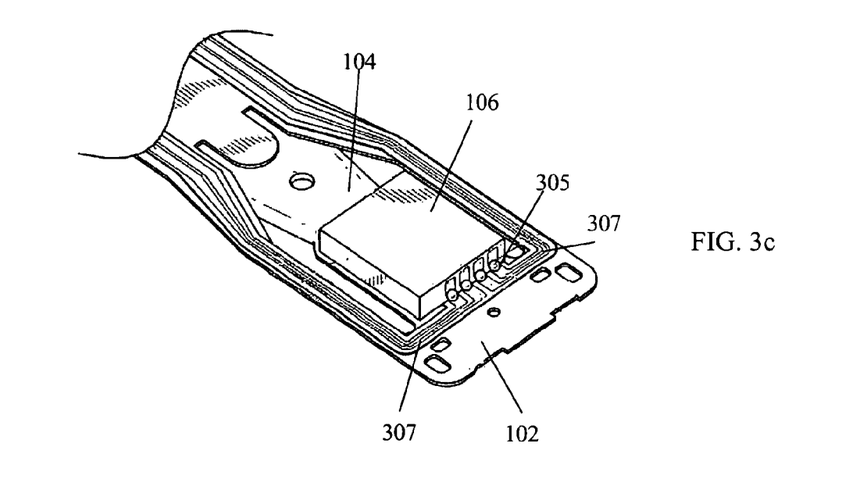
FIG. 3c is a partially, enlarged perspective view of the HGA shown in FIG. 3a seen from another angle, showing the slider partially mounted on the suspension tongue and electrically connected to multi-traces of the suspension by electrical balls.

Referring to FIGS. 3a-3c, according to an embodiment of the present invention, a HGA 10 includes a slider 106 and a suspension 101 for supporting the slider 106.

First, referring to FIG. 3a and FIG. 3c, the suspension 101 includes a load beam 102, a base plate 105 connecting to an end of the load beam 102, and a flexure 103 mounted on the other end of the load beam 102. Severing as an example embodiment, the flexure 103 connects with the load beam 102 by laser welding. There are multiple traces 307 formed in the flexure 103.

Referring to FIG. 3b, the flexure 103 provides a suspension tongue 104 located on the slider bearing region. According to an embodiment of the present invention, the load beam 102 forms a dimple 30 thereon that includes a first bump 301, a second bump 302 and a shaft 330 connecting the first bump 301 and the second bump 302. A suspension through hole 303 is defined in the suspension tongue 104 at a position corresponding to the dimple 30. The shaft 330 of the dimple 30 extends through the suspension through hole 303. In this embodiment, diameters of the first bump 301 and the second bump 302 are bigger than that of the suspension through hole 303, thus, the dimple 30 limits the suspension tongue 104 between the first bump 301 and the second bump 302. Under the presence of the first bump 301, a parallel clearance 201 is formed between the load beam 102 and the suspension tongue 104 so as to make the slider 106 move freely. The slider 106 is partially mounted on the suspension tongue 104 by an adhesive material with the center of the back surface of the slider 106 aligning with the suspension through hole 303. Because the shaft 330 extends through the suspension through hole 330, the second bump 302 is sandwiched between the slider 106 and the suspension tongue 104 and the first bump 301 and the second bump 302 align with the center of the back surface of the slider 106.

Referring to FIG. 3c again, the slider 106 provides multiple pads 404, and the suspension tongue 104 provides multiple electric pads 402 at positions corresponding to the electric pads 404. One end of the multiple traces 307 electrically connects with the multiple electric pads 402, and the other end connects with a control system (not shown). The electric pads 404 and 402 electrically connect with each other by multiple electrical conductive balls 305 (GBB or SBB), thereby electrically connecting the slider 106 with the multiple traces 307. Thus, the control system can control the slider 106 through the multiple traces 307.

Figure 4A:
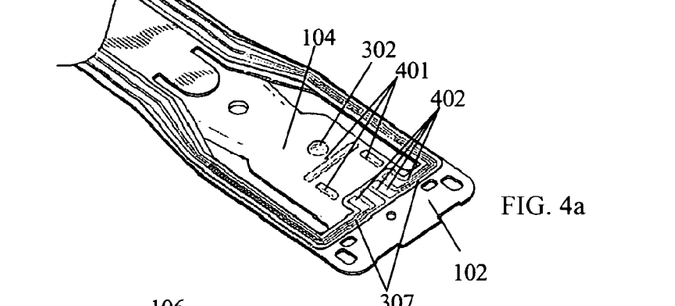
FIGS. 4a-4c are views illustrating steps of mounting the slider on the suspension.
Figure 4B:
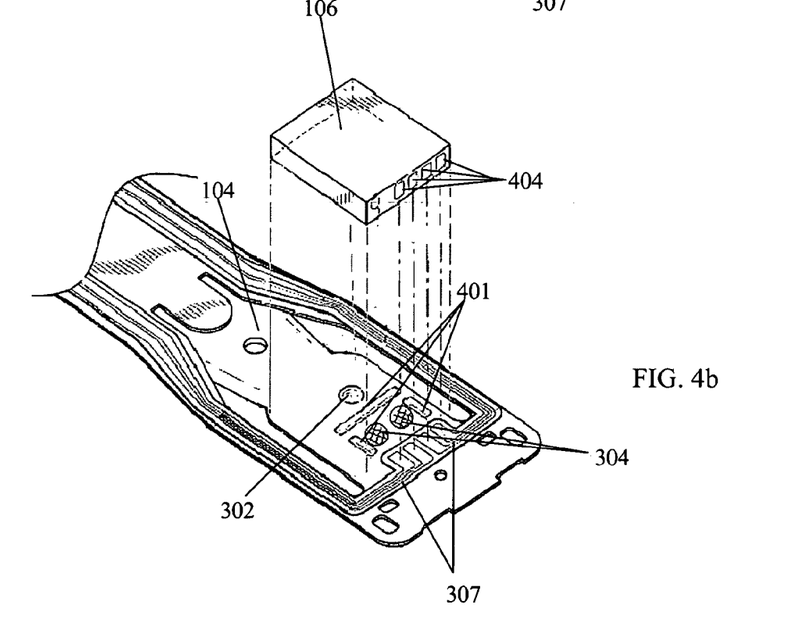
Figure 4C:
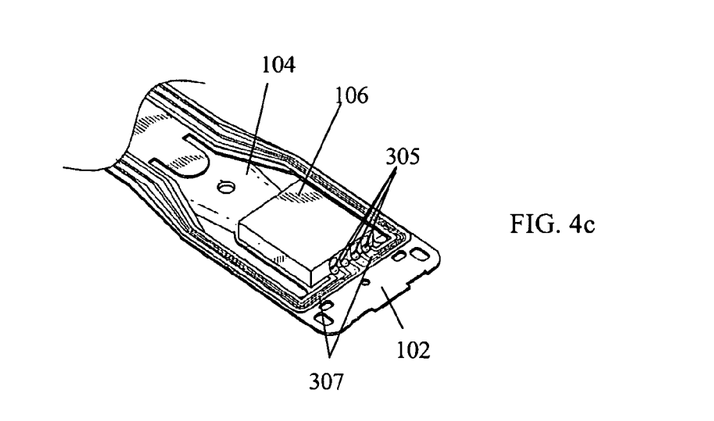

FIGS. 4a-4c show steps of mounting the slider 106 on the suspension 101. Referring to FIG. 4a, the second bump 302 protrudes to the suspension tongue 104 on the suspension. Four electric pads 402 formed in the suspension tongue 104 electrically connect with the multiple traces 307 respectively. The suspension tongue 104 provides a mounting pattern 401 thereon between the second bump 302 and the electric pads 402 for applying an adhesive material thereon, and a plurality of protruded ribs are formed around the mounting pattern 401 for preventing the adhesive material 304 overflow. Referring to FIG. 4b, the adhesive material 304 is applied on the mounting pattern 401. Then, the slider 106 with four electric pads 404 is located on the suspension tongue 104 with the electric pads 404 aligning with the electric pads 402 of the suspension tongue 104. Thus, the slider 106 is adhered to the suspension tongue 104 by the adhesive material 304, and the adhesive material 304 provides a clearance 200 between the slider 106 and the suspension tongue 104 by its thickness. The height of the clearance 200 is bigger than that of the second bump 302. Because the mounting pattern 401 corresponds to partial region of the slider 106, the slider 106 is partially mounted on the suspension tongue 104. Referring to FIG. 4c, four electric pads 404 of the slider 106 is soldered with four electric pads 402 of the suspension tongue 104 through four electrical conductive balls 305, thereby electrically connecting the slider 106 and the suspension tongue 104. Thus the slider 106 is mounted on the suspension 101.

Figure 6:
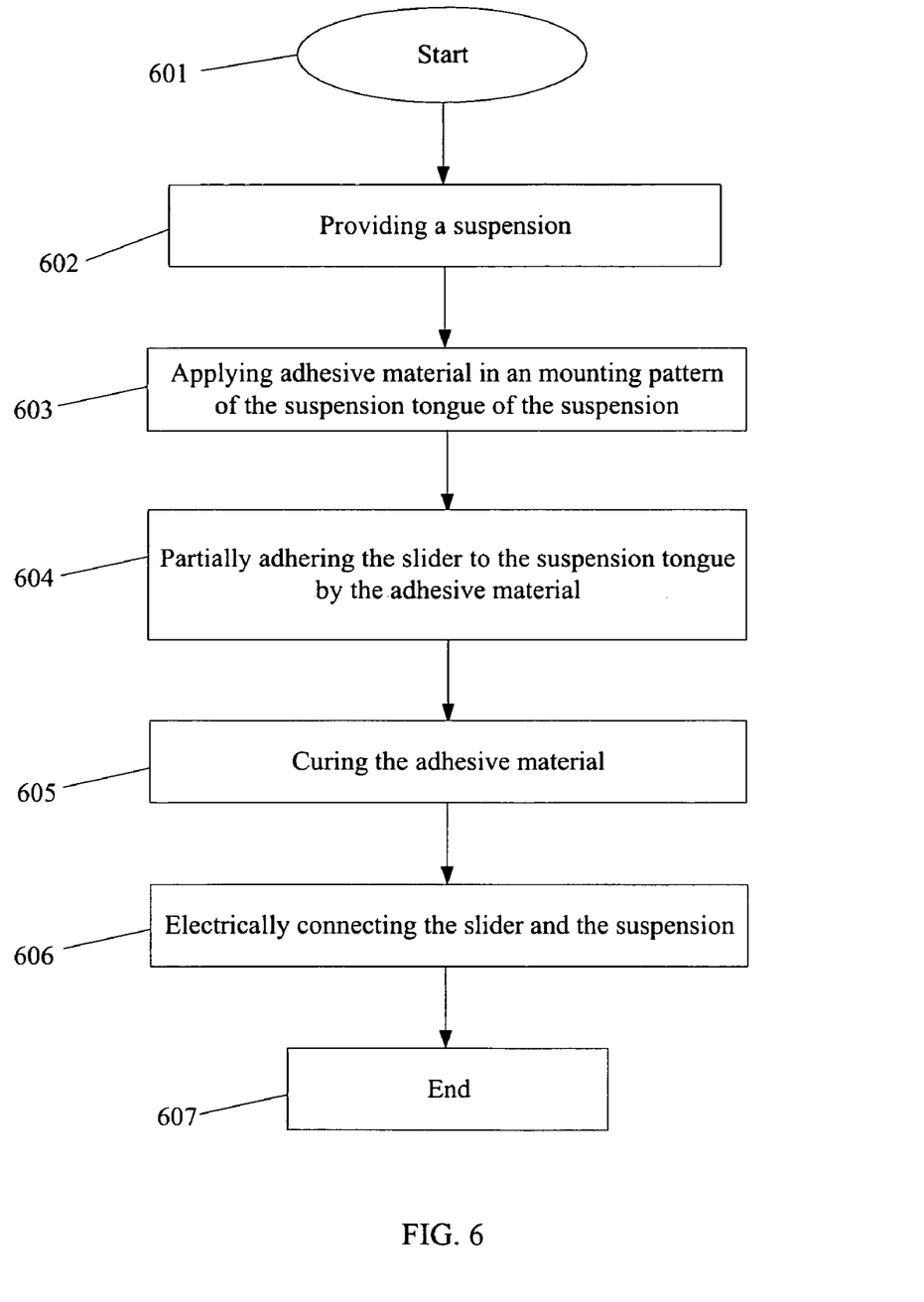
FIG. 6 is a flow chart of mounting the slider on the suspension according to the present invention.

Referring to FIG. 6 in conjunction with FIGS. 4a-4c, the method of mounting the slider 106 on the suspension 101 is further generalized as the following steps: first, starting from step 601; then carrying on step 602, providing the suspension 101 as above that has the suspension tongue 104 with the mounting pattern 401 thereon; and carrying on step 603, applying the adhesive material 304 on the mounting pattern 401 of the suspension tongue 104 of the suspension 101. In the present invention, the adhesive material 304 is UV epoxy, thin film adhesive or other suitable adhesive. The adhesive material 304 is 5 um-30 um in thickness and less than 0.6 um in length. The thickness of the adhesive material 304 is designed that the second bump 302 does not touch the slider 106 after the slider 106 mounted on the suspension tongue 104. On the other hand, severing as an embodiment of the present invention, the mounting pattern 401 may be located on the end region between the second bump 302 and the electric pads 402 so that a portion of the slider 106 adjacent to the leading edge thereof is mounted on the suspension tongue 104. Severing as the other embodiment of the present invention, it will be appreciated alternatively that the mounting pattern 401 may also be located on the inner region of the suspension tongue 104 behind the second bump 302 so that a portion of the slider 106 adjacent to the trailing edge thereof is mounted on the suspension tongue 104. Now carrying on step 604, placing the slider 106 on the mounting pattern 401 of the suspension tongue 104 and partially adhering the slider 106 on the suspension tongue 104 by adhesive material 304; then carrying on step 605, curing the adhesive material, and the slider 106 being fixed to the suspension tongue 104; then carrying on step 606, electrically connecting the slider 106 and the suspension 101. Severing as an embodiment of the present invention, the electric pads 404 and 402 are electrically connected with each other by multiple electrical conductive balls 305 (GBB or SBB). Lastly, the mounting process is finished in step 607. After the slider 106 mounted on the suspension 101, the second bump 302 points to the center of the back surface of the slider 106 without contact.

Figure 5B:
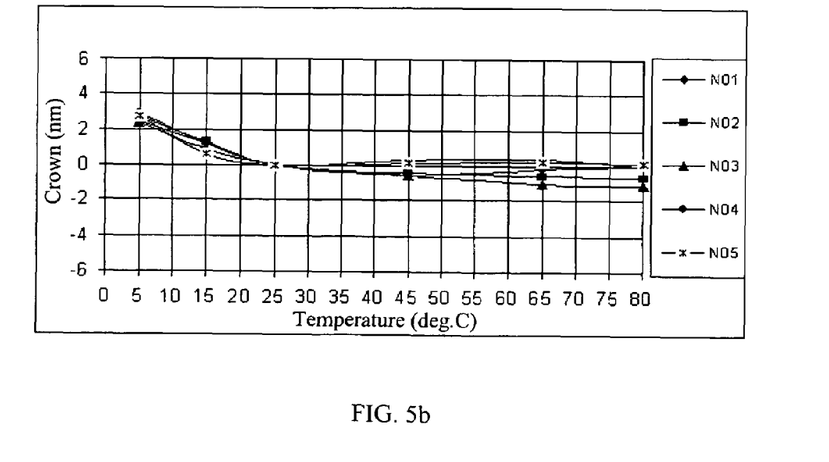
FIG. 5b is a graphical chart of the slider crown change of the present HGA against temperature.

FIG. 5b is a graphical chart of the slider crown of the present HGA against the temperature. As FIG. 5b shows, comparing with the prior art, since the slider is assembled by the mounting method of the present invention, the crown change of the slider against the temperature is very small, which will ensure the stability of the ABS crown, thus to keep the slider flying height stability and improve the slider fly characteristic during high-speed rotation of the slider.

Referring to FIG. 3b, the configuration of the dimple 30 limits the suspension tongue 104 between the first bump 301 and the second bump 302 so that the relative position of the load beam 102 and the suspension tongue 104 can be accurately limited. Namely, the load beam 102 and the suspension tongue 104 can be kept high assembly accuracy. In another aspect, after the slider 106 mounted on the suspension 101, the configuration of the dimple 30 makes the first bump 301 accurately align with the center of the back surface of the slider 106 without deflection, which ensures the load force from the load beam always evenly transferring to the center of the slider through the first bump 301 when the slider 106 is flying, thus to make the slider always keep balance and do not cause vibration, and finally ensure the slider a good fly stability and improve the slider flying characteristic. In a further aspect, the HGA of the present invention has a good shock performance because the dimple 30 and the suspension tongue 104 never separate and the load force directly apply to the slider 106 through the first dump 301 during the disk drive unit working, which ensures enough dimple contact force between the first bump 301 and the suspension tongue 104.

FIGS. 7*a*-7*f* are steps of manufacturing the HGA shown if FIGS. 3*a*-3*b* according to a first embodiment of the present invention. In this embodiment, firstly, providing a slider 106, a load beam 102, a flexure 103 with a suspension tongue 104; secondly, forming a suspension through hole 303 in the suspension tongue 104 at a position corresponding to a center of the slider 106 to be mounted on the suspension tongue 104; providing a blank dimple 7 which has a first bump 301 and a stainless shaft 330 extending from the first bump 301; thereafter, fixing the first bump 301 to the load beam 102 at a position corresponding to the suspension through hole 303 by mechanical mechanism, by soldering or other suitable ways; then, pressing the flexure 103 on the load beam 102 and making the stainless shaft 330 of the blank dimple 7 extend through the suspension through hole 303 of the suspension tongue 104; forming a second bump 302 at a free end of the stainless shaft 330 so as to connect the load beam 102 and the suspension tongue 104 and limit the flexure 103 between the first bump 301 and the second bump 302, thereby the flexure 103 and the load beam 102 never separate, and the relative position of the flexure 103 and the load beam 102 can be accurately regulated. Namely, the flexure 103 and the load beam 102 can be kept in high position accuracy, which will improve the slider 106 fly characteristic and the shock performance and enhance the slider 106 flying stability.

Figure 7A:
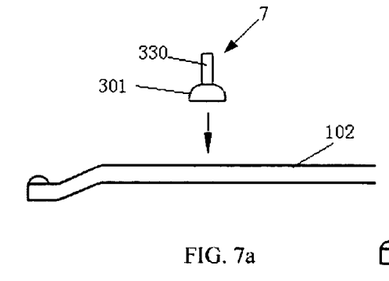
FIGS 7a-7e are views illustrating partial steps of manufacturing the HGA according to a first embodiment of the present invention.
Figures 7B, 7C, 7E, 7F, 7G:
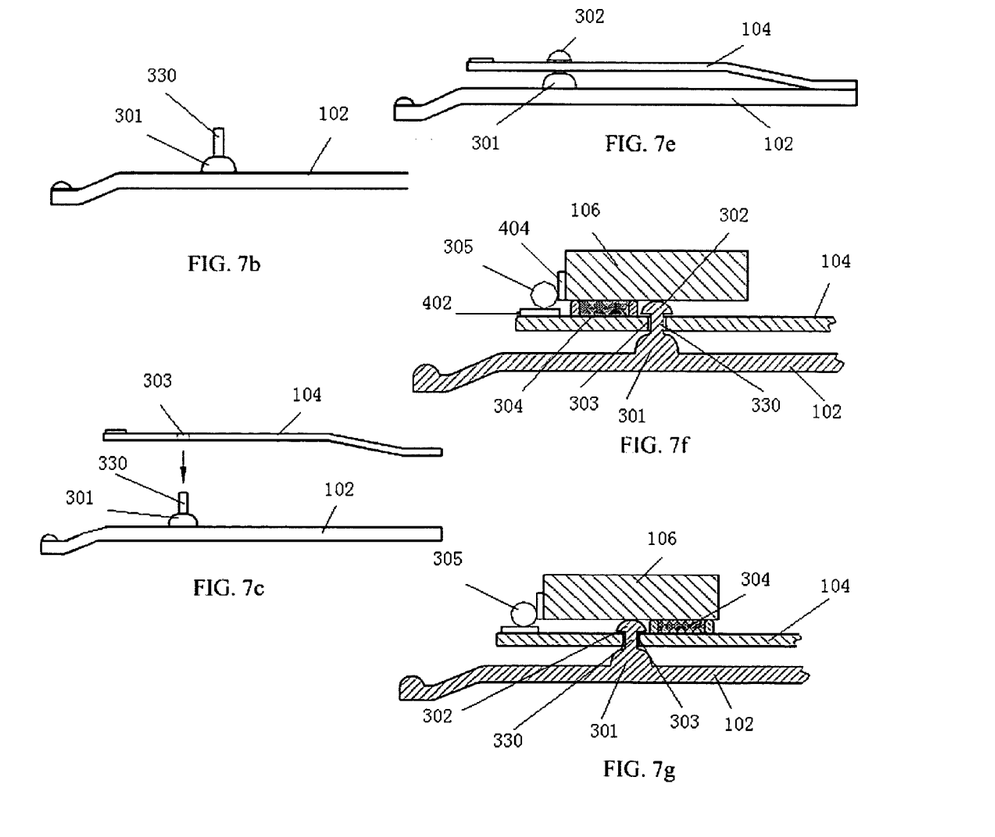
FIG. 7f is a cross-sectional view of the slider mounted on the suspension in a first way.
FIG. 7g is a cross-sectional view of the slider mounted on the suspension in a second way.
Figure 7D:
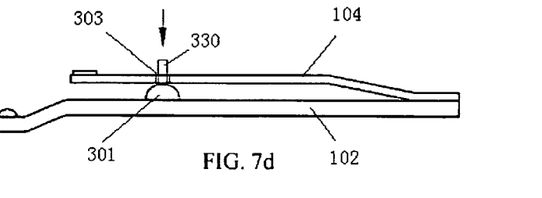

As shown in FIG. 7*f*, the slider 106 is mounted on the flexure 106 by the adhesive material. According to an embodiment of the invention, the adhesive material 304 is bonded the slider 106 at a region near the leading edge of the slider 106. The slider 106 is partially connected with the flexure 103 with a region near the trailing edge of the slider 106 and the flexure 103 out of contact. The first bump 301 aligns with the center of the back surface of the slider 106. The electric pads 404 of the slider 106 and the electric pads 402 of the flexure 103 connect with each other by multiple electrical conductive balls 305.

As shown in FIG. 7*g*, severing as the other embodiment of the present invention, the adhesive material 304 adheres the slider at a region near the trailing edge of the slider 106. The slider 106 is partially connected with the flexure 103 with a region near the leading edge of the slider 106 and the flexure 103 out of contact. The first bump 301 aligns with the center of the back surface of the slider 106. The electric pads 404 of the slider 106 and the electric pads 402 of the flexure 103 connect with each other by multiple electrical conductive balls 305.

Figure 8A:
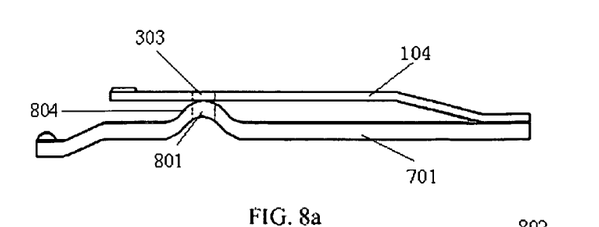
FIGS. 8a-8d are views illustrating partial steps of manufacturing the HGA according to a second embodiment of the present invention.
Figure 8B:
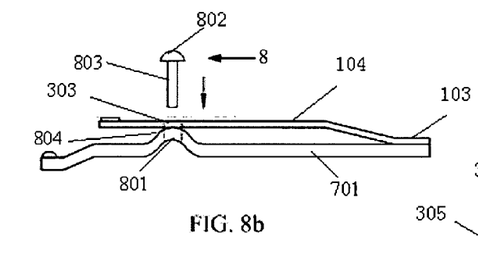
Figure 8C:
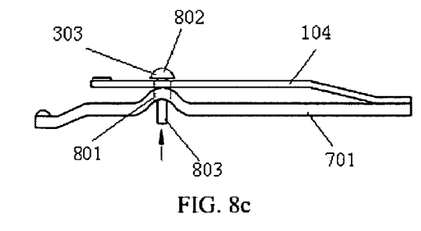
Figure 8D:
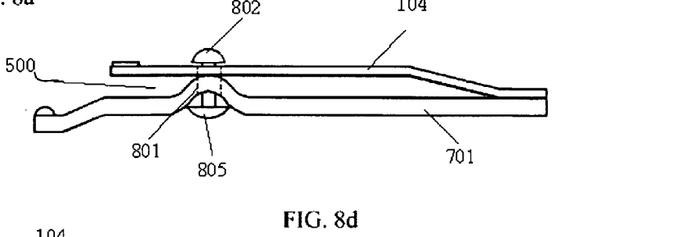
Figure 8E:
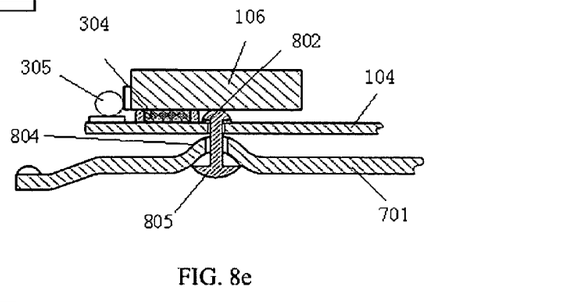
FIG. 8e is a cross-sectional view of the slider mounted on the suspension in a first way.
Figure 8F:
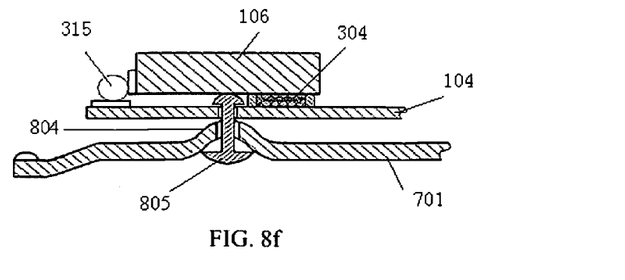
FIG. 8f is a cross-sectional view of the slider mounted on the suspension in a second way.

FIGS. 8*a*-8*e* show steps of manufacturing the HGA according to a second embodiment of the present invention. In this embodiment, firstly, providing a slider 106, a load beam 701, a flexure 103 with a suspension tongue 104; secondly, forming a suspension through hole 303 in the suspension tongue 104 at a position corresponding to a center of the slider 106 to be mounted on the suspension tongue 104, and forming a load beam through hole 801 in the load beam 701 at a position corresponding to the suspension through hole 303; forming a bow bump 804 on the load beam 701 with the load beam through hole 801 as the center of the bow bump 804; then, aligning the suspension through hole 303 with the load beam through hole 801; next, providing a blank dimple 8 which has a first bump 802 and a stainless shaft 803 extending from the first bump 802, making the stainless shaft 803 of the blank dimple 8 extend through the suspension through hole 303 and the load beam through hole 801; forming a second bump 805 at a free end of the shaft 803 so as to connect the load beam 701 and the suspension tongue 104 and limit the flexure 103 and the load beam 701 between the first bump 802 and the second bump 805, thereby the flexure 103 and the load beam 701 never separate with each other, and the relative position of the flexure 103 and the load beam 701 are accurately regulated. Namely, the flexure 103 and the load beam 701 can be kept a high position accuracy, thus improving fly characteristic of the slider 106, the shock performance of the HGA, and enhance the slider 106 flying stability. In the assembly, the bow bump 804 supports the flexure 103 such that a clearance 500 is formed between the suspension tongue 104 and the load beam 701. The clearance 500 allows the slider 106 mounted on the flexure 103 to move freely. As FIG. 8*e* shows, the mounting of the slider 106 to the flexure 103 is the same with that shown FIG. 7*f*, therefore a detailed description of which is omitted herefrom. According to another embodiment, the mounting of the slider 106 to the flexure 103 shown in FIG. 8*f* is same to that shown in FIG. 7*f*, therefore a detailed description of which is also omitted herefrom.

Figures 9A, 9B, 9C, 9D, 9E, 9F:
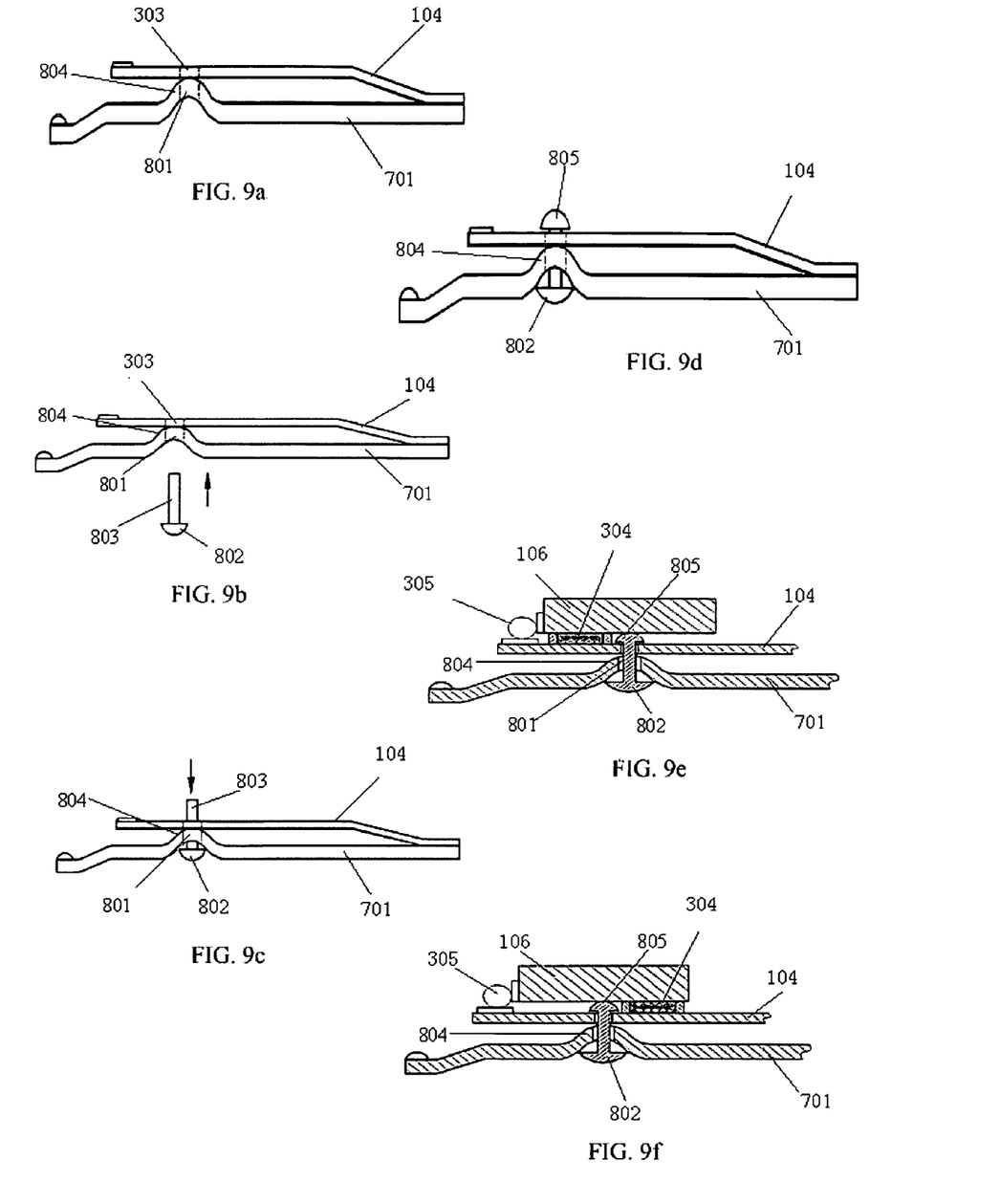
FIGS. 9a-9d are views illustrating partial steps of manufacturing the HGA according to a third embodiment of the present invention.
FIG. 9e is a cross-sectional view of the slider mounted on the suspension in a first way.
FIG. 9f is a cross-sectional view of the slider mounted on the suspension in a second way.

FIGS. 9*a*-9*e* show steps of manufacturing the HGA according to a third embodiment of the present invention. The embodiment is similar with the embodiment shown in FIGS. 8*a*-8*e* except that the sequence and the direction of the shaft 803 extending through the load beam hole 801 and the suspension through hole 303 is different, but also achieves the same effect and function of the embodiment of FIGS. 8*a*-8*e*. As FIG. 9*e* and FIG. 9*f* show, the mounting of the slider 106 to the flexure 103 is the same with the embodiments of FIG. 8*e* and FIG. 8*f* respectively, therefore a detailed description of which is also omitted herefrom.

In the present invention, it is understandable that the material of the dimple is not limited to stainless steel. Other suitable material having certain intensity and rigidity can also be used to manufacture the dimple.

The dimple of the present invention is very easy to manufacture and an assembly accuracy thereof can be ensured so as to improve the slider fly height characteristic, shock performance and enhances the flying stability of the slider.

Figure 10:
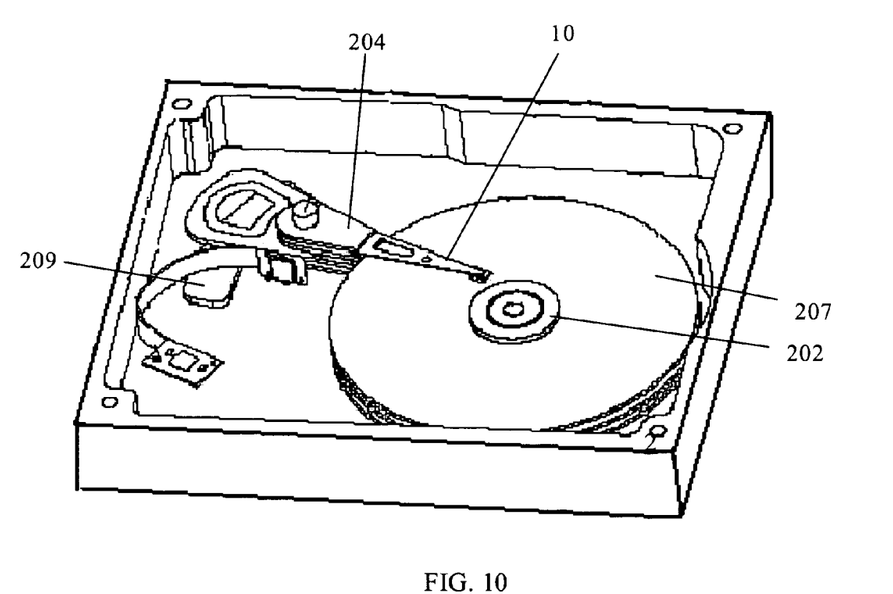
FIG. 10 illustrates a disk drive unit according to an embodiment of the present invention.

As shown in FIG. 10, a disk drive unit according to the embodiment of the present invention is illustrated. The disk drive unit 2 includes the HGA 10 as described above, a suspension arm 204 for connecting with the HGA 10, a disk group 207, a voice-coil motor (VCM) 209, and a spindle motor 202 to spin the disk group 207. Because the structure and/or assembly process of disk drive unit of the present invention are well known to persons ordinarily skilled in the art, a detailed description of such structure and assembly is omitted herefrom.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention, such as the first and the second bumps of the dimple are designed to be square, triangular, arched, etc.

What is claimed is:

1. A head gimbal assembly comprising:
    a slider;
    a suspension for supporting the slider, the suspension comprising a load beam, a base plate, and a flexure having a suspension tongue to hold the slider, which are assembled together; wherein
    a suspension through hole being defined in the suspension tongue at a position corresponding to a center area of the slider; and
    a dimple connecting the suspension tongue with the load beam, the dimple having a first bump, a second bump and a shaft connecting the first and the second bumps, the shaft of the dimple extending through the suspension through hole to limit the suspension tongue between the first and the second bumps.

2. The head gimbal assembly according to claim 1, wherein diameters of the first and the second bumps are bigger than that of the shaft.

3. The head gimbal assembly according to claim 1, wherein the slider is partially mounted on the suspension tongue.

4. The head gimbal assembly according to claim 1, wherein an adhesive material is sandwiched between the slider and the suspension tongue to adhere the slider to the suspension tongue, the height of the adhesive material is bigger than that of the second bump.

5. The head gimbal assembly according to claim 1, wherein a bow bump is formed on the load beam to support the suspension tongue, a load beam through hole is formed in the bow bump corresponding to the suspension through hole, the shaft of the dimple extends through the load beam through hole to limit the load beam between the first and the second bumps.

6. The head gimbal assembly according to claim 1, wherein the suspension tongue comprises a mounting pattern thereon for applying an adhesive material therein.

7. The head gimbal assembly according to claim 6, wherein a plurality of protruded ribs are formed around the mounting pattern on the suspension tongue.

8. The head gimbal assembly according to claim 6, wherein the mounting pattern is formed at a position corresponding to a leading edge or a trailing edge of the slider.

9. The head gimbal assembly according to claim 1, wherein the shaft of the dimple is made of stainless steel.

10. A disk drive unit comprising:
    a head gimbal assembly;
    a drive arm connecting with the head gimbal assembly;
    a disk; and
    a spindle motor to spin the disk;
    wherein the head gimbal assembly comprises:
    a slider;
    a suspension for supporting the slider, the suspension comprising a load beam, a base plate, and a flexure having a suspension tongue to hold the slider, which are assembled together; wherein
    a suspension through hole being defined in the suspension tongue at a position corresponding to a center area of the slider; and
    a dimple connecting the suspension tongue with the load beam, the dimple having a first bump, a second bump and a shaft connecting the first and the second bumps, the shaft of the dimple extending through the suspension through hole to limit the suspension tongue between the first and the second bumps.

11. The disk drive unit according to claim 10, wherein diameters of the first and the second bumps are bigger than that of the shaft.

12. The disk drive unit according to claim 10, wherein the slider is partially mounted on the suspension tongue.

13. The disk drive unit according to claim 10, wherein an adhesive material is sandwiched between the slider and the suspension tongue to adhere the slider to the suspension tongue, the height of the adhesive material is bigger than that of the second bump.

14. The disk drive unit according to claim 10, wherein a bow bump is formed on the load beam to support the suspension tongue, a load beam through hole is formed in the bow bump corresponding to the suspension through hole, the shaft of the dimple extends through the load beam through hole to limit the load beam between the first and the second bumps.

15. A manufacturing method of a head gimbal assembly comprising the steps of:
    providing a slider, a load beam, and a flexure having a suspension tongue;
    forming a suspension through hole in the suspension tongue at a position corresponding to a center area of the slider mounted on the suspension tongue;
    providing a blank dimple, the blank dimple having a first bump and a shaft extending from the first bump;
    fixing the first bump to the load beam at a position corresponding to the suspension through hole;
    extending the shaft of the blank dimple through the suspension through hole of the suspension tongue;
    forming a second bump at a free end of the shaft so as to connect the load beam with the suspension tongue; and
    mounting the slider on the suspension tongue at a predetermined position thereon.

16. The manufacturing method according to claim 15, wherein the blank dimple is stainless material.

17. The manufacturing method according to claim 15, wherein the first bump is fixed to the load beam by mechanism or soldering.

18. The manufacturing method according to claim 15, wherein providing the flexure comprises a step of forming a mounting pattern on the suspension tongue.

19. The manufacturing method according to claim 15, wherein the slider is partially mounted on the suspension tongue.

20. A manufacturing method of a head gimbal assembly comprising the steps of:
    providing a slider, a load beam, and a flexure having a suspension tongue;
    forming a suspension through hole in the suspension tongue at a position corresponding to a center area of the slider mounted on the suspension tongue, and forming a load beam through hole in the load beam at a position corresponding to the suspension through hole;
    aligning the suspension through hole with the load beam through hole;
    providing a blank dimple, the blank dimple having a first bump and a shaft extending from the first bump;
    extending the shaft of the blank dimple through the suspension through hole of the suspension tongue and the load beam through hole of the load beam;
    forming a second bump at a free end of the shaft so as to connect the load beam with the suspension tongue; and
    mounting the slider on the suspension tongue at a predetermined position thereon.

21. The manufacturing method according to claim 20, wherein providing the load beam further comprises a step of forming a bow bump on the load beam with the load beam through hole as a center of the bow bump.

22. The manufacturing method according to claim 20, wherein providing the flexure comprises a step of forming a mounting pattern on the suspension tongue.

23. The manufacturing method according to claim 20, wherein the slider is partially mounted on the suspension tongue.

* * * * *